(12) United States Patent
Ochiai et al.

(10) Patent No.: US 9,019,460 B2
(45) Date of Patent: Apr. 28, 2015

(54) LIQUID CRYSTAL DISPLAY DEVICE

(71) Applicant: Japan Display Inc., Mobara-shi, Chiba (JP)

(72) Inventors: Takahiro Ochiai, Chiba (JP); Masaki Nishikawa, Chiba (JP); Motoharu Miyamoto, Mobara (JP)

(73) Assignee: Japan Display Inc., Tokyo (JP)

( * ) Notice: Subject to any disclaimer, the term of this patent is extended or adjusted under 35 U.S.C. 154(b) by 155 days.

(21) Appl. No.: 13/633,152

(22) Filed: Oct. 2, 2012

(65) Prior Publication Data
US 2013/0088675 A1  Apr. 11, 2013

(30) Foreign Application Priority Data

Oct. 5, 2011 (JP) .................................. 2011-221252

(51) Int. Cl.
*G02F 1/1339* (2006.01)
*G02F 1/1337* (2006.01)
*G02F 1/1345* (2006.01)

(52) U.S. Cl.
CPC ............ *G02F 1/1337* (2013.01); *G02F 1/1339* (2013.01); *G02F 1/1345* (2013.01)

(58) Field of Classification Search
CPC .............. H01L 21/0272; G02F 1/1337; G02F 1/13394; G02F 1/1345
USPC .......................................... 349/123, 152–155
See application file for complete search history.

(56) References Cited

U.S. PATENT DOCUMENTS

| | | | |
|---|---|---|---|
| 2004/0183986 A1* | 9/2004 | Onda et al. ..................... | 349/153 |
| 2011/0207022 A1* | 8/2011 | Wieser et al. ................. | 429/512 |
| 2011/0310337 A1* | 12/2011 | Ishihara et al. ............... | 349/123 |

FOREIGN PATENT DOCUMENTS

| | | |
|---|---|---|
| CN | 101078832 A | 11/2007 |
| CN | 101206356 A | 6/2008 |
| CN | 101211068 A | 7/2008 |
| CN | 102591060 A | 7/2012 |
| JP | 2010-008444 | 1/2010 |

OTHER PUBLICATIONS

Office Action issued by SIPO dated Nov. 4, 2014 of corresponding Chinese application No. 201210385190.4.

* cited by examiner

*Primary Examiner* — Huyen Ngo
(74) *Attorney, Agent, or Firm* — Lowe Hauptman & Ham, LLP

(57) ABSTRACT

A liquid crystal display device having an alignment layer stopper which is formed external to a display area to suppress the generation of an electric field between signal lines and the alignment layer stopper, wherein the alignment layer stopper includes a second conductive layer SP formed above the first substrate when the alignment layer stopper is formed by coating and a first conductive layer SH formed below the second conductive layer SP through an insulating film and arranged in such a manner that its marginal parts in the longitudinal direction of the second conductive layer SP are exposed when viewed from the plane direction from the second conductive layer SP, and the first conductive layer SH is formed in a thin film layer between signal lines arranged in the side parts of the display area and the second conductive layer SP.

17 Claims, 14 Drawing Sheets

LIQUID CRYSTAL DISPLAY DEVICE

CLAIMS OF PRIORITY

The present application claims priority from Japanese Patent Application JP2011-221252 filed on Oct. 5, 2011, the content of which is hereby incorporated by reference into this Application.

BACKGROUND OF THE INVENTION

1. Field of the Invention

The present invention relates to a liquid crystal display device and, specifically, to a technology which is effectively used to control the coating area of an alignment layer.

2. Description of the Related Art

A liquid crystal display device includes a pair of transparent substrates sandwiching liquid crystals as a housing, and the liquid crystals are sealed by a seal material which also serves to fix the pair of the transparent substrates. The area surrounded by this seal material constitutes an effective display area (also simply referred to as "display area") in which pixels as constituent elements of the liquid crystal display device are arranged in a matrix. The each pixel has a thin film transistor and is independently driven by, for example, active matrix drive system so that the pixels can display an image in the effective display area.

An alignment layer is formed on a surface in direct contact with the liquid crystals of each of the transparent substrates of the liquid crystal display device constituted as described above. This alignment layer is to orient the molecules of the liquid crystals in a certain direction (initial orientation direction) and is formed by orienting a resin film formed by coating. In this case, it is desired that the alignment layer should be formed in such a manner that a certain distance is kept between its peripheral end and the seal material. This is because the reliability of the sealing function of the seal material deteriorates when the alignment layer is formed into the formation area of the seal material.

Meanwhile, it is desired that a liquid crystal display device which is incorporated into a personal digital assistance such as a cell phone should have as large a display area as possible with its small external size (the so-called frame size should be small), and therefore the separation distance between the seal material and the alignment layer cannot be made sufficiently large. Therefore, there is known a liquid crystal display device including a linear transparent conductive film layer made of ITO (Indium Tin Oxide) which surrounds the alignment layer in the area between the seal material and the alignment layer. This transparent conductive film layer functions as a stopper (may be referred to as "alignment layer stopper" hereinafter) which prevents a resin film before curing from flowing into the formation area of the seal material when the alignment layer is formed. The reason that the alignment layer stopper is formed of a transparent conductive film is that the alignment layer stopper is formed of the same layer as a pixel transparent electrode and can be formed simultaneously with the formation of the pixel electrode. An example of the liquid crystal display device constituted as described above is a liquid crystal display device disclosed by Japanese Unexamined Patent Application No. 2010-8444.

SUMMARY OF THE INVENTION

However, when a signal line which crosses the alignment layer stopper is existent in the circuit wiring of a liquid crystal display device, the alignment layer stopper which is formed of a conductive thin film has a problem that the signal line crossing the alignment layer stopper may be oxidized or dissolved by water existent under a high-temperature high-humidity environment and an electric field generated between the alignment layer stopper and the signal line crossing the alignment layer stopper. As a result, there is a problem that a designed scanning signal or image signal may not be obtained by the oxidization or dissolution of this signal line.

It is an object of the present invention which is made in view of these problems to provide a liquid crystal display device which suppresses an electric field between a signal line crossing an alignment layer stopper and the alignment layer stopper so that the oxidization or dissolution of the sign line crossing the alignment layer stopper can be suppressed.

Although the present invention can be viewed from a plurality of viewpoints, the liquid crystal display of the present invention viewed from a certain point of view is as follows. The liquid crystal display device of the present invention viewed from another point of view will become apparent from the description of embodiments of the present invention which will be described hereinunder.

(1) That is, although the present invention includes a plurality of means for solving the above problems, as one of the means, the liquid crystal display device of the present invention is a liquid crystal display device including:

a first substrate having a plurality of scanning signal lines extending in the X direction and parallel to one another in the Y direction and a plurality of image signal lines extending in the Y direction and parallel to one another in the X direction formed thereover;

a second substrate opposed to the first substrate through a liquid crystal layer;

a display area surrounded by the scanning signal lines and the image signal lines in which pixels are arranged in a matrix, wherein the first substrate and the second substrate are fixed by means of a seal material formed along the marginal part of the second substrate, the liquid crystal layer is sealed between the first substrate and the second substrate, the first substrate is larger in size than the second substrate, and a connection terminal is formed in an exposed area not opposed to the second substrate of the first substrate;

an alignment layer stopper which is formed external to the display area and along at least two different sides of the display area and prevents an alignment layer before curing from flowing into the area of the seal material when the alignment layer is formed, and wherein the alignment layer stopper is made of a thin film material having hydrophobic nature for a liquid alignment layer material and includes a second conductive layer SP formed above the first substrate and a first conducive layer SH arranged below the second conductive layer SP through an insulating film and arranged in such a manner that its marginal parts in the longitudinal direction when viewed in a plane direction from the second conductive layer SP are exposed from the marginal parts in the longitudinal direction of the second conductive layer SP, and the first conductive layer SH is formed between signal lines arranged in side parts of the display area and the second conductive layer SP through an insulating film layer.

(2) Although the present invention can be viewed from a plurality of viewpoints, describing the liquid crystal display device of the present invention from another point of view in addition to (1), the liquid crystal display device of the present invention is a liquid crystal display device including:

a first substrate having a plurality of scanning signal lines extending in the X direction and parallel to one another in the Y direction and a plurality of image signal lines extending in the Y direction and parallel to one another in the X direction formed thereover;

a second substrate opposed to the first substrate through a liquid crystal layer;

a display area surrounded by the scanning signal lines and the image signal lines in which pixels are arranged in a matrix, wherein the first substrate and the second substrate are fixed by means of a seal material formed along the marginal part of the second substrate, the liquid crystal layer is sealed between the first substrate and the second substrate, the first substrate is larger in size than the second substrate, and a connection terminal is formed in an exposed area not opposed to the second substrate of the first substrate;

a drive circuit for generating a scanning signal and/or an image signal, which is formed in the peripheral part of the display area and formed from thin film transistors formed in the same step as the formation of the pixels;

control signal lines for electrically coupling the connection terminal to the drive circuit, and wherein a groove is formed in an area between a plurality of the thin film transistors in the formation area of the drive circuit and reaches the formation area of the control signal lines, the groove has a bent area reaching the formation area of the control signal lines, and the bottom part of the groove formed closer to the display area than the bent area has a projecting area projecting toward the liquid crystal surface side.

(3) Further, describing the liquid crystal display device from still another point of view, the liquid crystal display of the present invention is a liquid crystal display device including:

a first substrate having a drive circuit and signal lines formed in side parts;

a second substrate opposed to the first substrate and formed smaller in size than the first substrate;

a seal material formed along the marginal part of the second substrate and used to fix the first substrate and the second substrate;

a liquid crystal layer sealed by the seal material between the first substrate and the second substrate;

a connection terminal formed in an exposed area not disposed to the second substrate of the first substrate;

a display area in which a plurality of pixels are arranged in a matrix;

an alignment layer formed over the first substrate and the second substrate; and an alignment layer stopper formed external to the display area and along at least two different sides of the display area and used to prevent an alignment layer before curing from flowing into the area of the seal material when the alignment layer is formed, wherein the alignment layer stopper is made of a thin film material having hydrophobic nature for a liquid alignment layer material and includes a second conductive layer formed above the first substrate and extending along the sides and a first conductive layer formed below the second conductive layer through an insulating film and extending along the second conductive layer, its marginal parts in the extending direction project from the marginal parts in the extending direction of the second conductive layer, and the first conductive layer is formed between signal lines arranged in the side parts of the display are and the second conductive layer through an insulating film.

According to the present invention, an electric field generated between a signal line formed in the peripheral part of the effective display area of a liquid crystal display and an alignment layer stopper is suppressed so that the oxidization or dissolution of the signal line crossing the alignment layer stopper can be suppressed.

Other effects of the present invention will become apparent from the description of the whole specification.

DETAILED DESCRIPTION OF THE INVENTION

Preferred embodiments of the present invention will be described hereinunder with reference to the accompanying drawings. It is to be understood that the following description is given of preferred embodiments of the invention, the invention is not limited to these embodiments, and various changes and modifications may be made in the invention by a person skilled in the art within the scope of the technical idea disclosed in this specification. In all the drawings for explaining embodiments and specific examples, elements having the same function are given the same reference symbols, and repeated explanations thereof may be omitted.

<First Embodiment>

Figure 1:
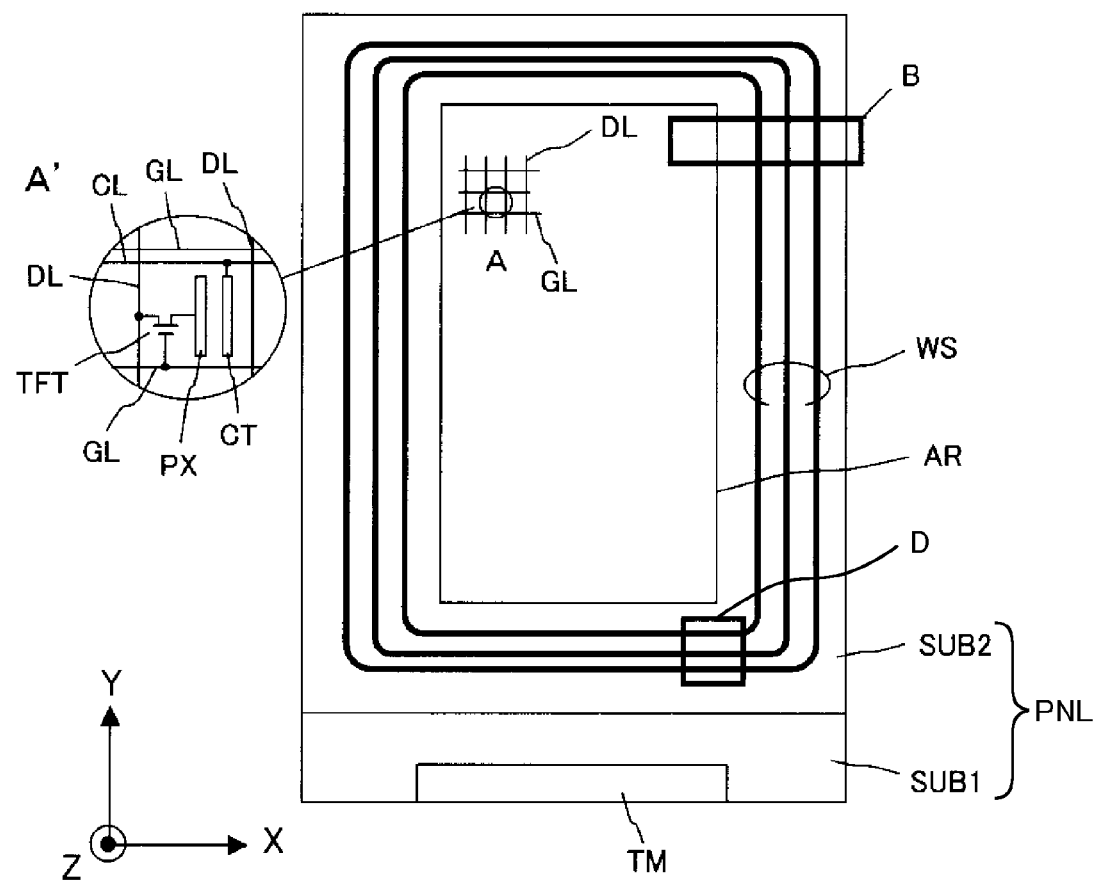
FIG. 1 is a plan view for explaining the whole constitution of a liquid crystal display device according to First Embodiment of the present invention.

FIG. 1 is a plan view for explaining the whole constitution of a liquid crystal display device according to First Embodiment of the present invention. With reference to FIG. 1, the whole constitution of the liquid crystal display device of First Embodiment will be explained. In FIG. 1, X, Y and Z denote X axis, Y axis and Z axis (Z axis is a vertically upward direction from the sheet), respectively.

The liquid crystal display device of First Embodiment has a liquid crystal display panel PNL including a first substrate SUB1 over which pixel electrodes PX and thin film transistors TFT are to be formed, a second substrate SUB2 which is opposed to the first substrate SUB1 and over which a color filter is to be formed, and a liquid crystal layer to be sandwiched between the first substrate SUB1 and the second substrate SUB2. The liquid crystal display device is constructed by combining the liquid crystal display panel PNL and an unshown back light unit as a light source. The fixing of the first substrate SUB1 and the second substrate SUB2 and the sealing of liquid crystals are carried out by a seal material which is applied annularly to the peripheral part of the second substrate. In the liquid crystal display device of First Embodiment, an area in which display pixels (to be simply referred to as "pixels" hereinafter) are to be formed within an area filled with the liquid crystals is a display area AR. Therefore, even in the area filled with the liquid crystals, an area in which no pixels are formed and which does not contribute to display is not the display area AR. That is, in the liquid crystal display device of First Embodiment, an annular alignment layer stopper WS is formed in an area between the seal material and the display area AR. Owing to this constitution, when an alignment layer material is applied to the liquid crystal surface side of the first substrate SUB1, an alignment layer is prevented from being formed into the coating area of the seal material. The alignment layer stopper WS will be detailed hereinafter.

The second substrate SUB2 has a smaller area than that of the first substrate SUB1 so that the lower side part in the figure of the first substrate SUB1 is exposed. A drive circuit which is formed of a semiconductor chip and drives pixels arranged in the display area AR is mounted and a connection terminal TM for inputting a control signal into the drive circuit is formed in the side part of the first substrate SUB1. In the following description, the liquid crystal display panel PNL may be described as the liquid crystal display device even in the explanation of the panel PNL. At least one of the first substrate SUB1 and the second substrate SUB2 is a transparent substrate. As a matter of course, both of them may be transparent substrates. As for the material of the transparent substrate, a known glass substrate is generally used as a substrate but a transparent resin insulating substrate may also be used.

In the liquid crystal display device of First Embodiment, scanning signal lines (gate lines) GL which extend in the X direction and are parallel to one another in the Y direction in FIG. 1 and to which a scanning signal is supplied from the drive circuit are formed in the display area AR on the liquid crystal side surface of the first substrate SUB1. Image signal lines (drain lines) DL which extend in the Y direction and are parallel to one another in the X direction in FIG. 1 and to which an image signal (tone signal) is supplied from the drive circuit are formed. An area surrounded by two adjacent drain lines DL and two adjacent gate lines GL constitutes a pixel, and a plurality of pixels are arranged in a matrix in the display area AR along the drain lines DL and the gate lines GL.

As shown in the equivalent circuit diagram A' of a round part A in FIG. 1, each pixel has a thin film transistor TFT which is driven ON and OFF by a scanning signal from the gate line GL, a pixel electrode PX to which an image signal is supplied from the drain line DL through the thin film transistor TFT driven on, and a common electrode CT to which a common signal having a potential as a standard for the potential of the image signal is supplied through a common line CL. In the equivalent circuit diagram A' of the round part A of FIG. 1, the pixel electrode PX and the common electrode CT are typically depicted linearly but the pixel electrode PX in First Embodiment is a plate-like transparent electrode formed for each pixel. The common electrode CT is a plate-like transparent electrode formed at least in the display area AR, and slits are formed in the transparent electrode. The drain electrode and the source electrode of the thin film transistor TFT of First Embodiment are driven alternately by the application of a bias. In this text, for convenience sake, the side to be coupled to the drain line DL is the drain electrode and the side to be coupled to the pixel electrode PX is the source electrode.

An electric field having a parallel component to the main surface of the first substrate SUB1 is generated between the pixel electrode PX and the common electrode CT, and the molecules of the liquid crystals are driven by this electric field. This liquid crystal display device is known as a liquid crystal display device capable of so-called wide viewing angle display and called "transverse electric field system" or "IPS (In-Plane Switching) system" according to the specificity of application of an electric field to the liquid crystals. In the liquid crystal display device of First Embodiment, normaly black display is employed that light transmittance is minimized (black display) when an electric field is not applied to the liquid crystals and improved when an electric field is applied.

Ends of each drain line DL and each gate line GL are extended beyond the display area AR and coupled to the drive circuit formed in the side part of the first substrate SUB1. The drive circuit generates a drive signal such as an image signal or a scanning signal based on a control signal input from an external system through the connection terminal TM. In the liquid crystal display device of First Embodiment, the drive circuit is formed of a semiconductor chip and mounted over the first substrate SUB1. At least one or both of an image signal drive circuit for outputting an image signal and a scanning signal drive circuit for outputting a scanning signal may be mounted on a flexible printed circuit board coupled to the connection terminal TM by tape carrier system or COF (Chip On Film) system to be coupled to the first substrate SUB1.

<Detailed Constitution of Alignment Layer Stopper>

Figure 2:
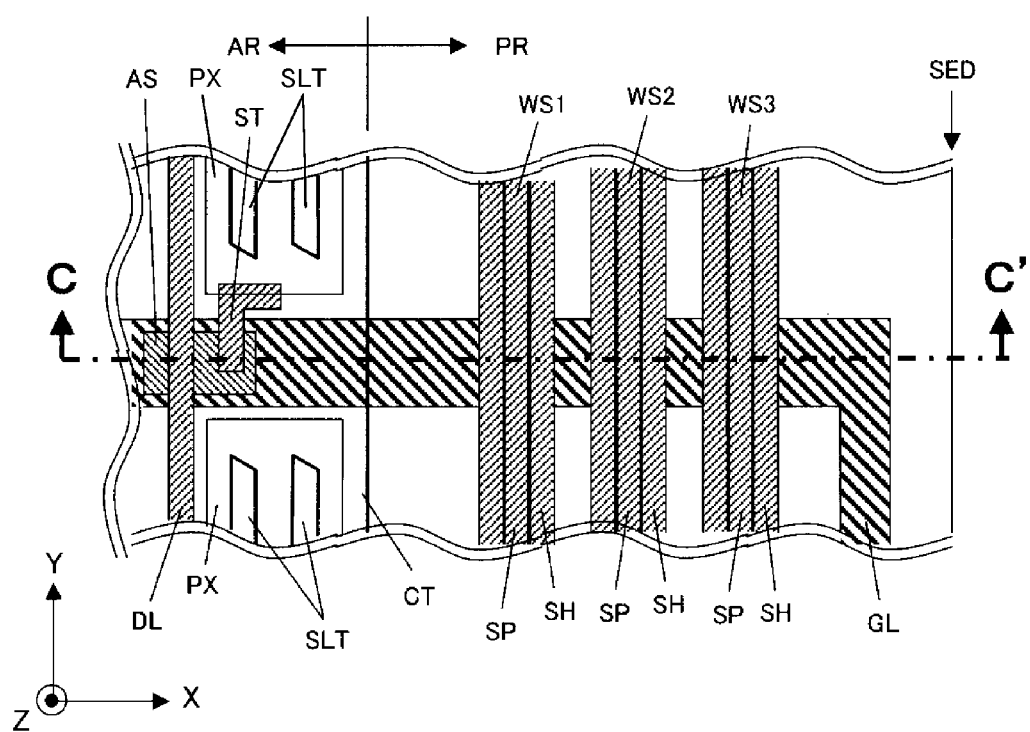
FIG. 2 is an enlarged view for explaining the detailed constitution of an alignment layer stopper in the liquid crystal display device according to First Embodiment of the present invention.
Figure 3:
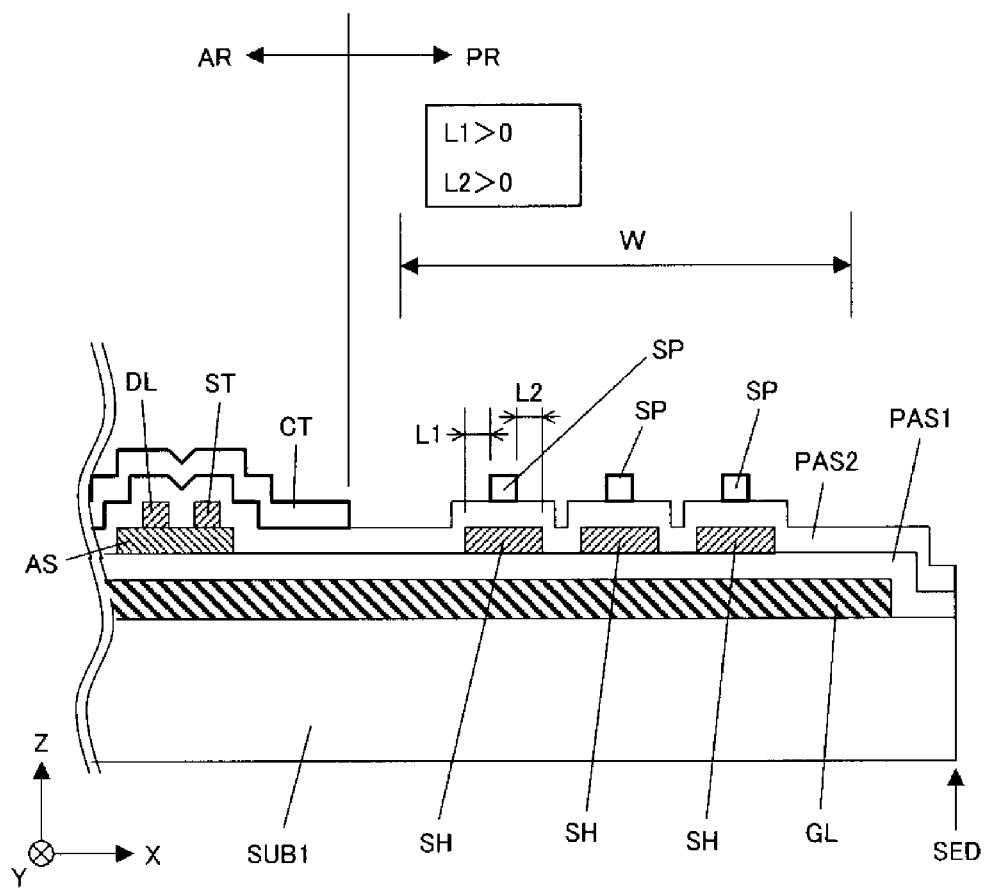
FIG. 3 is a sectional view taken on line C-C' of FIG. 2.

FIG. 2 is an enlarged view for explaining the detailed constitution of the alignment layer stopper in the liquid crystal display device according to First Embodiment of the present invention, and FIG. 3 is a sectional view taken on line C-C' of FIG. 2. The detailed constitution of the alignment film stopper WS of First Embodiment will be explained with reference to FIG. 2 and FIG. 3. FIG. 2 is an enlarged view of a part B shown in FIG. 1, that is, a side part in the longitudinal direction of the liquid crystal display device of First Embodiment.

As shown in FIG. 2, a semiconductor layer AS made of amorphous silicon or the like is superimposed over the gate line GL extending in the X direction on the display area AR side. At this point, as shown in FIG. 3, the semiconductor layer AS is superimposed through an insulating film PAS1 formed over the gate line GL, and the insulating film PAS1 functions as a gate insulating film in this superimposed area. One end of the semiconductor layer AS is superimposed by the drain line DL to form a drain electrode DT and the other end is superimposed by a metal thin film which will become a source electrode ST so as to form a thin film transistor TFT. That is, as shown in FIG. 3, the drain line DL is superimposed over one end of the semiconductor layer AS to form the drain electrode DT and the metal thin film is superimposed over the other end of the semiconductor layer AS to form the source electrode ST. An extension part extending from the source electrode ST is a transparent conductive film made of, for example, ITO (Indium Tin Oxide) and electrically coupled to the plate-like pixel electrode PX formed in each pixel area. Therefore, an image signal output to the drain line DL is supplied to the pixel electrode PX in synchronism with a scanning signal input into the gate line GL. As obvious from FIG. 2 and FIG. 3, the common electrode CT which is included of a transparent conductive film made of, for example, ITO is formed above the pixel electrode PX through an insulating film PAS2. At this point, the common electrode CT is formed flat in the pixel area AR, and slits SLT are formed in an area superimposed over the pixel electrode PX to forma linear common electrode CT superimposed over the pixel electrode PX.

As shown in FIG. 2, the gate line GL is extended in the peripheral part PR external to the display area AR, which is called "frame area". An alignment layer stopper WS including three alignment layer stoppers WS1 to WS3 is formed between the display area AR and the unshown coating area of the seal material. As shown in FIG. 3, the alignment layer stoppers WS1 to WS3 in this First Embodiment are each formed from a first conductive layer SH formed over the gate line GL, that is, on the liquid crystal surface side and a second conductive layer SP formed above the first conductive layer SH, that is, on the liquid crystal surface side. The second conductive layer SP in this First Embodiment is made of a transparent conductive film material such as ITO which has low wettability for the alignment layer material (high hydrophobic nature and high contact) like the alignment layer stopper of the related art. Further, the second conductive layer SP is formed on the surface of the insulating film PAS2 which is formed to cover the surface of the first substrate SUB1. When the water surface tension of the transparent conductive film forming the second conductive layer SP is represented by γsp and the water surface tension of the insulating film PAS2 is represented by γPAS2, the surface tension γsp and the surface tension γPAS2 differ from each other. The material of the second conductive layer SP is not limited to a transparent conductive film material such as ITO and may be another oxide conductive material such as zinc-oxide based AZO (Aluminum doped Zinc Oxide) or GZO (Gallium doped Zinc Oxide).

That is, the alignment layer stoppers WS1 to WS3 in the First Embodiment are formed over the first substrate SUB1 and are each formed from the second conductive layer SP which is formed in the same step as the transparent conductive film which becomes the common electrode CT and the first conductive layer SH which is formed below the second conductive layer SP on the first substrate SUB1 side and in the same step as the drain line DL and the source electrode ST. The first conductive layer SH and the second conductive layer SP are electrically coupled to each other through an unshown contact hole formed in the insulating film PAS2. At this point, as described above, in the thin film transistor TFT of First Embodiment, the gate line GL is formed below the insulating film PAS1, that is, in a layer closer to the first substrate SUB1 than the insulating film PAS1. Therefore, as shown in FIG. 3, the first conductive layer SH is superimposed over the gate line GL through the insulating film PAS1 in the area where the gate line GL and the first conductive layer SH cross each other. That is, the first conductive layer SH is formed between the second conductive layer SP and the gate line GL through the insulating films PAS1 and PAS2. The first conductive layer SH in First Embodiment is coupled to an unshown signal line in the peripheral part and kept at a predetermined voltage.

As shown in FIG. 3, in the alignment layer stopper area shown by an arrow W, the line width of the second conductive layer SP in each of the alignment layer stoppers WS1 to WS3 is smaller than the line width of the first conductive layer SH. That is, when viewed from the display surface side of the liquid crystal display device of First Embodiment, the marginal part of the second conductive layer SP does not extend beyond the marginal part of the first conductive layer SH planarly in the direction where the alignment layer stoppers WS1 to WS3 are parallel to one another. In other words, when viewed in the plane direction from the second conductive layer SP side, the marginal part in the longitudinal direction of the first conductive layer SH is exposed from the marginal part in the longitudinal direction of the second conductive layer SP. Still in other words, the first conductive layer SH extends along the second conductive layer SP and its marginal part in the extending direction projects beyond the marginal part in the extending direction of the second conductive layer SP. For example, when the distance in the X direction from one end of the first conductive layer SH to one end of the second conductive layer SP is represented by L1 and the distance in the X direction from the other end of the first conductive layer SH to the other end of the second conductive layer SP is represented by L2, L1>0 and L2>0. According to this constitution, the leakage of an electric field to the surrounding area can be prevented, and the effect of making an electric field constant can be further improved.

<Potential of Alignment Layer Stoppers>

Figure 4:
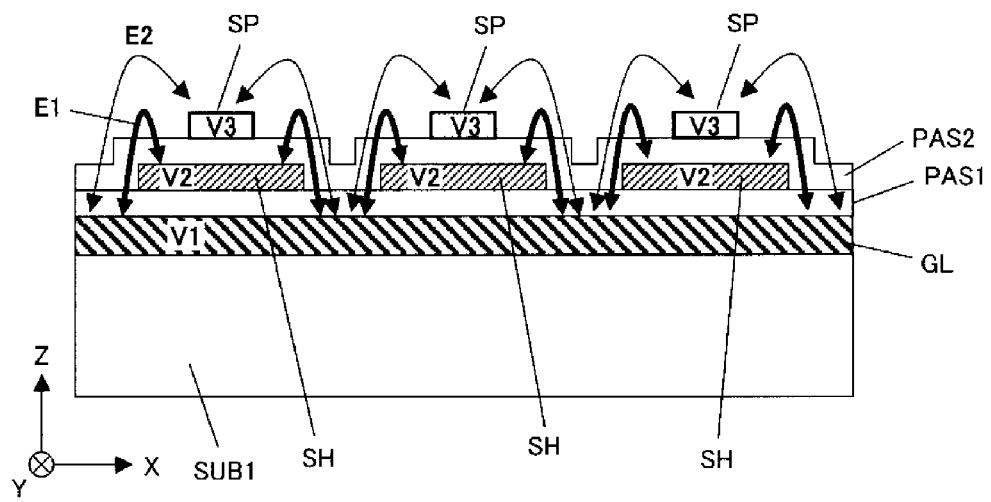
FIG. 4 is an enlarged view of an alignment layer stopper area in the liquid crystal display device according to First Embodiment of the present invention.

FIG. 4 is an enlarged view of the alignment layer stopper area in the liquid crystal display device according to First Embodiment of the present invention. The effect of preventing corrosion caused by an electric field of the second conductive layer SP by the first conductive layer SH will be described with reference to FIG. 4. FIG. 4 is an enlarged view of the alignment layer stopper area shown in FIG. 3. V1 to V3 in FIG. 4 denote voltages applied to the conductive films.

According to the constitution of the related art liquid crystal display device, only the second conductive layer SP is formed in such a manner that it is exposed from the surface of the first substrate SUB1, and the gate line GL which is a signal line formed below the alignment layer stopper WS formed from the second conductive layer SP and the second conductive layer SP are arranged through an insulating film. When this insulating film has a crack or a defect, the liquid crystals, the second conductive layer SP, the insulating film having a crack or a defect and the signal line (gate line GL) are arranged in this area in this order. Particularly when water enters the panel in a high-temperature high-humidity environment, the liquid crystals containing water, the second conductive layer SP, the insulating film having a crack or a defect and the gate line GL are arranged in this order. Even when the second conductive layer SP forming the alignment layer stopper WS is kept at a fixed potential, the potential of the gate line GL is not fixed and therefore, an electric field between the second conductive layer SP and the gate line GL is not fixed. Particularly when the potential of the second conductive layer SP is negative, the potential of the gate line GL is positive, and the gate line GL is disconnected by anode dissolution due to the existence of water entering the insulating film, display abnormality such as a line defect or a lighting failure occurs in the liquid crystal display device.

In contrast to this, in the alignment layer stoppers WS1 to WS3 in First Embodiment which has been explained with reference to FIGS. 1 to 4, as will be described in detail hereinafter, the first conductive layer SH and the second conductive layer SP are electrically coupled to each other through an unshown contact hole formed in the insulating film PAS2. That is, in the alignment layer stoppers WS1 to WS3 of First Embodiment, the voltage V2 of the first conductive layer SH and the voltage V3 of the second conductive layer SP are the same. Further, the line width of the second conductive layer SP is smaller than the line width of the first conductive layer SH. Therefore, in the area where the alignment layer stoppers WS1 to WS3 cross the gate line GL, when an electrical field generated between the gate line GL and the first conductive layer SH is represented by E1 and an electric field generated between the gate line GL and the second conductive layer SP is represented by E2, the electric field E1 becomes large and the electric field E2 can be made very small (suppressed). As a result, even when the liquid crystal display device of First Embodiment is used at a high temperature and a high humidity, it is possible to prevent corrosion such as the oxidation or dissolution of the gate line GL caused by water contained in the liquid crystal layer LC or water entering from the seal material and an electric field E between the second conductive layer SP and the gate line GL. Therefore, the reliability of the liquid crystal display device of First Embodiment can be improved. Further, the occurrence of a sealing failure caused by the extension of the alignment layer at the time of producing the liquid crystal display device of First Embodiment can also be suppressed, thereby obtaining an effect that the yield can be improved.

At this point, the first conductive layer SH is covered with the insulating film PAST and the insulating film PAS2 all of which are formed from an inorganic insulating film material to be protected. Owing to this constitution, even when a relatively large electric field E1 is generated between the first conductive layer SH and the gate line GL, the corrosion of the first conductive layer SH caused by the application of the electric field E1 can also be prevented.

<Coupling Between First Conductive Layer and Second Conductive Layer>

Figure 5:
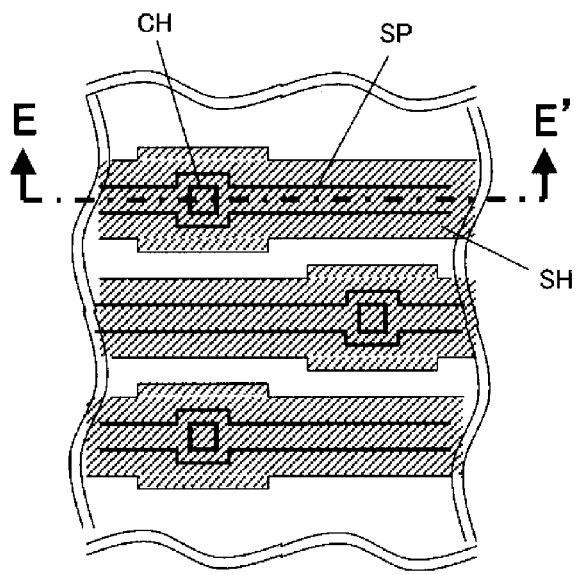
FIG. 5 is a plan view for explaining the constitution of contact holes for electrically coupling a first conductive layer to a second conductive layer in the liquid crystal display device according to First Embodiment of the present invention.
Figure 6:
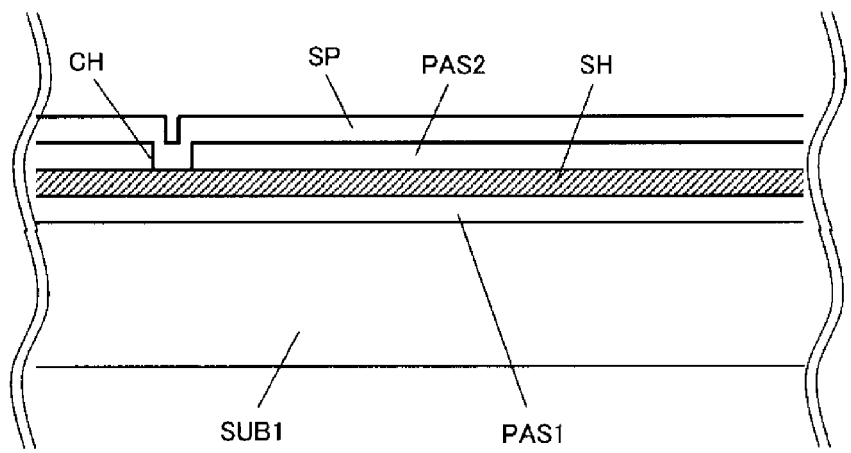
FIG. 6 is a sectional view taken on line E-E' of FIG. 5.

FIG. 5 is a plan view for explaining the constitution of a contact hole CH for electrically coupling the first conductive layer SH and the second conductive layer SP in the liquid crystal display device according to First Embodiment of the present invention. FIG. 6 is a sectional view taken on line E-E' of FIG. 5. Particularly, FIG. 5 is an enlarged view of a part D shown in FIG. 1. A drive circuit is also mounted to a side part where the connection terminal TM shown in FIG. 1 is to be formed, and the drive circuit and the drain lines DL in the display area AR are electrically coupled to each other. Therefore, according to the constitution of First Embodiment, the drive circuit and the drain lines DL are electrically coupled to each other through unshown signal lines formed in the same layer as the gate lines GL. According to this constitution, in the liquid crystal display device of First Embodiment, the alignment layer stoppers WS1 to WS3 each formed from the first conductive layer SH formed in the same layer as the drain lines DL and the second conductive layer SP formed in the same layer as the common electrode CT can be formed annularly around the display area AR.

Since the alignment layer stoppers WS1 to WS3 extend in the X direction and are parallel to one another in the Y direction in the side parts in the transverse direction of the liquid crystal display device of First Embodiment as shown in FIG. 5, an area having a large line width is formed in the first conductive layer SH and the second conductive layer SP, and the contact hole CH is formed in the insulating film PAS2 of this area. According to this constitution, as shown in FIG. 6, the first conductive layer SH and the second conductive layer SP are electrically coupled to each other, and the voltage V2 of the first conductive layer SH and the voltage V3 of the second conductive layer SP are kept at the same level. At this point, a fixed voltage V2 is supplied to the first conductive layer SH from the drive circuit or the connection terminal TM. Although the portion for forming the contact hole CH therein has a large line width, it may have the same line width as the other portion.

In First Embodiment, the gate line GL which is a signal line formed below the alignment layer stopper WS is formed from a metal thin film such as an aluminum film. Therefore, the corrosion of the gate line GL caused by anode dissolution may occur according to the voltage V1 of the gate line GL and the voltage V2 of the first conductive layer SH (voltage 3 of the second conductive layer SP). However, by setting the voltage V2 of the first conductive layer SH, that is, the voltage V3 of the second conductive layer SP higher than the voltage V1 of the gate line GL, the corrosion of the gate line GL caused by anode dissolution can be prevented. Further, corrosion by the reduction action of the second conductive layer SP itself which occurs when the second conductive layer SP formed of a transparent conductive film such as an ITO film becomes a cathode can be suppressed by setting this voltage.

Further, in the liquid crystal display device of First Embodiment, the first conductive layer SH and the second conductive layer SP are electrically coupled to each other through the contact hole CH, and the first conductive layer SH and the second conductive layer SP are kept at the same voltage. The present invention is not limited to this. For example, the voltage V2 applied to the first conductive layer SH may be different from the voltage 3 applied to the second conductive layer SP, or V3 V2. In this case, fixed voltages V1 and V2 can be supplied to the first conductive layer SH and the second conductive layer SP from the drive circuit or the connection terminal TM, respectively.

Figure 7:
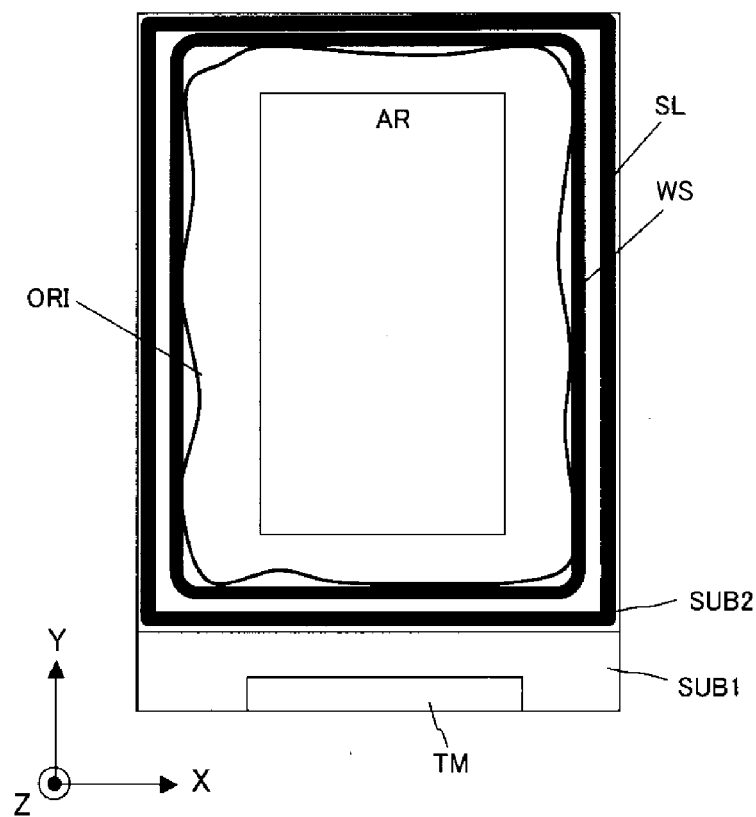
FIG. 7 is a diagram for explaining the positional relationship among an alignment layer, the alignment layer stopper and a seal material in the liquid crystal display device according to First Embodiment of the present invention.

FIG. 7 is a diagram for explaining the positional relationship among the alignment layer, the alignment layer stopper and the seal material in the liquid crystal display device according to First Embodiment of the present invention. As obvious from FIG. 7, the alignment layer ORI is stopped by the alignment layer stopper WS formed at a position a predetermined distance apart from the marginal part of the display area AR and a predetermined distance from the coating position of the seal material SL. As a result, the alignment layer ORI is formed to cover the display area AR, and the marginal part of the alignment layer ORI is limited to the area between the alignment layer stopper WS and the marginal part of the display area. That is, since it is possible to prevent the alignment layer ORI from being formed into the side parts of the second substrate SUB2 in which the seal material SL is to be applied, the sealing performance of the seal material SL can be improved and the reliability of the liquid crystal display device can be improved. Further, since the distance between the display area AR and the seal material SL can be reduced by the alignment layer stopper WS, the width of the peripheral part can be reduced and the frame part can be further narrowed. In the alignment layer stoppers WS1 to WS3 of First Embodiment, the contact hole CH is formed only in a side part on the connection terminal TM side which is one side in the transverse direction. The contact hole CH may be formed in two side parts in the transverse direction including one side in the transverse direction on the opposite side to the TM so as to electrically couple the first conductive layer SH to the second conductive layer SP.

As described above, in the liquid crystal display device of First Embodiment, the second conductive layer SP formed in the same layer as the common electrode CT formed from a transparent conductive film is arranged to surround the periphery of the display area AR annularly, and the first conductive layer SH having a larger line width than the second conductive layer SP is formed below the insulating film PAS2 over which the second conductive layer SP is formed. When viewed in the plane direction, the second conductive layer SP is superimposed over the first conductive layer SH to form the alignment layer stoppers WS1 to WS3. Owing to this constitution, in an area where the alignment layer stoppers WS1 to WS3 cross a signal line formed below these, a large electric field E1 is generated between the first conductive layer SH protected by the insulating film and the signal line. However, an electric field E2 between the second conducive layer SP exposed from the surface of the substrate and the signal line can be greatly suppressed. Therefore, even when the liquid crystal display device is used at a high temperature and a high humidity, the corrosion of the signal line caused by the electric field E2 between the second conductive layer SP and the signal line can be prevented and the reliability of the liquid crystal display device can be improved.

In the liquid crystal display device of First Embodiment, the alignment layer stopper WS is formed by using three alignment layer stoppers WS1 to WS3 to surround the display area AR. The number of alignment layer stoppers is not limited to 3 and may be 1 or more.

In the liquid crystal display device of First Embodiment, the common electrode CT is formed closer to the liquid crystal layer LC than the pixel electrode PX. The pixel electrode PX may be formed closer to the liquid crystal layer LC than the common electrode CT. In this case, a conductor for forming the alignment layer stoppers WS1 to WS3 is formed in the same step as the transparent conductive film constituting the pixel electrode PX, whereby the alignment layer stoppers WS1 to WS3 of First Embodiment can be formed without increasing the number of steps.

The constitution of First Embodiment is optimal for liquid crystal filling system called "ODF (One Drop Fill)" that, after the seal material is applied annularly to the liquid crystal surface side of the second substrate SUB2, liquid crystals are dropped into the coating area of the seal material and the first substrate SUB1 is joined to the top surface side of the second substrate SUB2. This can be applied to another liquid crystal filling system.

Further, the voltages V1 and V2 applied to the first conductive layer SH and the second conductive layer SP in First Embodiment may be clock signals having the same phase as the gate line GL. By applying this clock voltage to the first conductive layer SH and the second conductive layer SP, charge and discharge currents between the alignment layer stoppers WS1 to WS3 and the gate line GL caused by parasitic capacitance generated between the alignment layer stoppers WS1 to WS3 and the gate line GL can be suppressed, thereby making it possible to obtain an effect that a delay of the gate signal can be prevented and an effect that the consumption power of the liquid crystal display device of First Embodiment can be reduced. When the voltage of the gate line GL is represented by V1, V1≠V2 and V1≠V3. When the voltage of the drain line DL is represented by V4, preferably, V4≠V2 and V4≠V3. However, as an image signal for driving the liquid crystal layer LC is input into the drain line DL, the present invention is not limited to V4≠V2 and V4≠V3.

<Second Embodiment>

Figure 8:
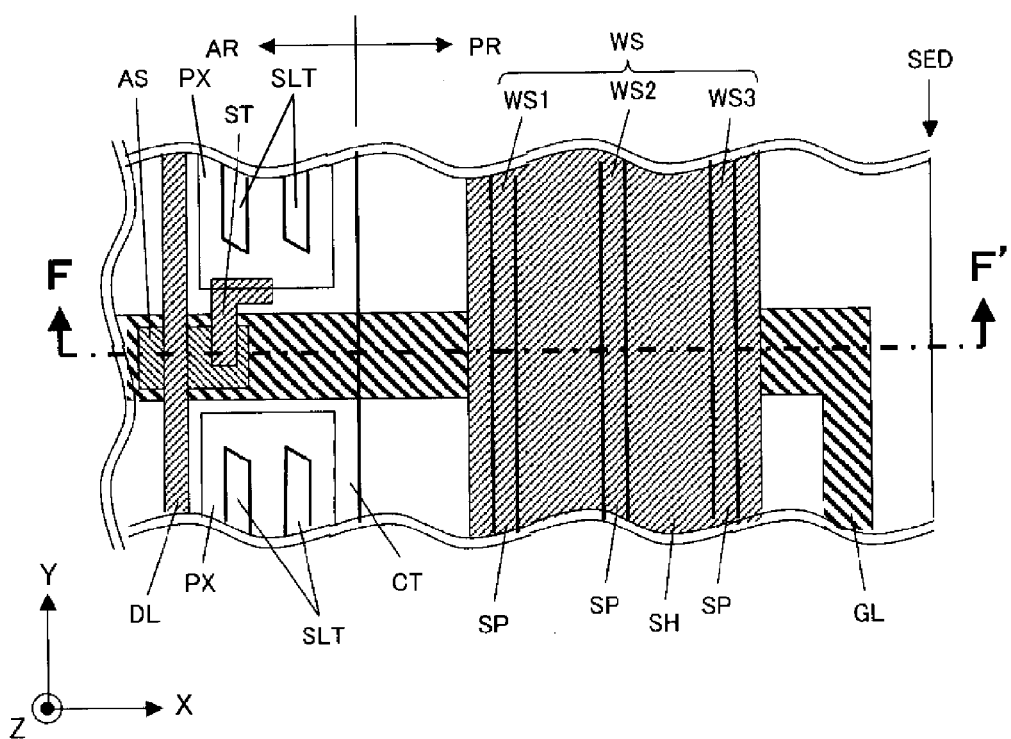
FIG. 8 is a plan view for explaining the schematic constitution of an alignment layer stopper in a liquid crystal display device according to Second Embodiment of the present invention.
Figure 9:
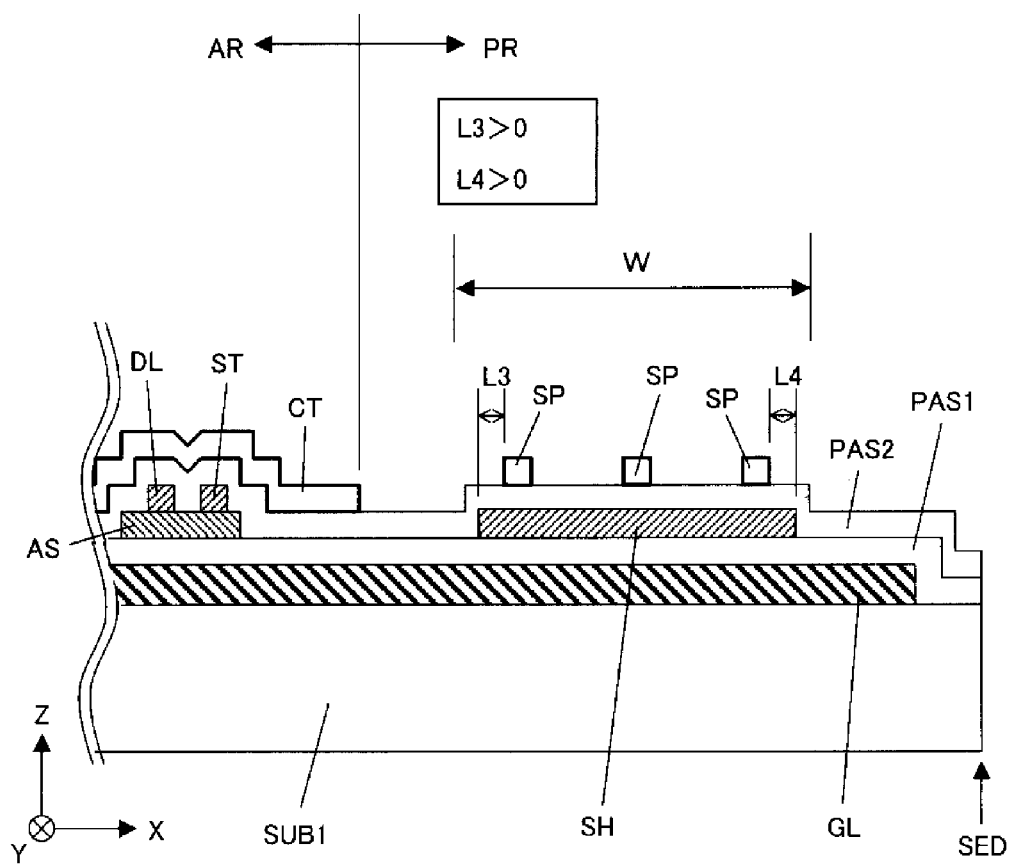
FIG. 9 is a sectional view taken on line F-F' of FIG. 8.

FIG. 8 is a plan view for explaining the schematic constitution of an alignment layer stopper in a liquid crystal display device according to Second Embodiment of the present invention. FIG. 9 is a sectional view taken on line F-F' of FIG. 8. The liquid crystal display device of Second Embodiment will be described with reference to FIG. 8 and FIG. 9. The liquid crystal display device of Second Embodiment has the same constitution as that of First Embodiment except for the constitution of the first conductive layer SH for forming the alignment layer stoppers WS1 to WS3. Therefore, in the following description, the constitution of the alignment layer stoppers WS1 to WS3 will be detailed.

As shown in FIG. 8, the alignment layer stoppers WS1 to WS3 forming the alignment layer stopper WS of Second Embodiment are formed in the peripheral part PR of the display area AR as in First Embodiment. At this point, as shown in FIG. 9, all the three second conductive layers SP formed on the liquid crystal surface side of the insulating film PAS2 are superimposed over one first conductive layer SH when viewed in the plane direction. That is, according to the constitution of Second Embodiment, three second conductive layers SP are formed over the first conductive layer SH having almost the same line width as that of the area of the alignment layer stopper WS shown by an arrow W in the figure through the insulating film PAS2.

At this point, like First Embodiment, the second conductive layers SP are not formed in an area exceeding the line width of the first conductive layer SH. That is, when viewed in the plane direction, the second conductive layers SP do not project from the marginal part of the first conductive layer SH. The planar distance between the marginal part on the display area AR side of the second conductive layer SP forming the alignment layer stopper WS1 closest to the display area AR out of the three alignment layer stoppers WS1 to WS3 and the marginal part on the display area AR side of the first conductive layer SH is represented by L3. The planar distance between the marginal part on the substrate end SED side of the second conductive layer SP forming the alignment layer stopper WS3 close to the substrate end (margin) SED of the first substrate SUB1 and the substrate end SED of the first conductive layer SH is represented by L4. In this case, L3>0 and L4>0.

According to this constitution, even in the liquid crystal display device of Second Embodiment, in the area where the alignment layer stoppers WS1 to WS3 cross the gate line GL, like First Embodiment, a large electric field E1 can be generated between the first conductive layer SH and the gate line GL and an electric field E2 between the second conductive layers SP and the gate line GL can be suppressed. That is, the electric field E2 between the second conductive layers SP and the gate line GL can be blocked by the first conductive layer SH formed in the area between the second conductive layers SP and the gate line GL, thereby making it possible to obtain the same effect as that of First Embodiment. Further, since the second conductive layers SP are formed in the entire area between the second conductive layers SP forming the alignment layer stoppers WS1 and WS3, a special effect can be obtained that the effect of blocking the electric field E1 between the first conductive layer SH and the gate line can be improved.

<Third Embodiment>

Figure 10:
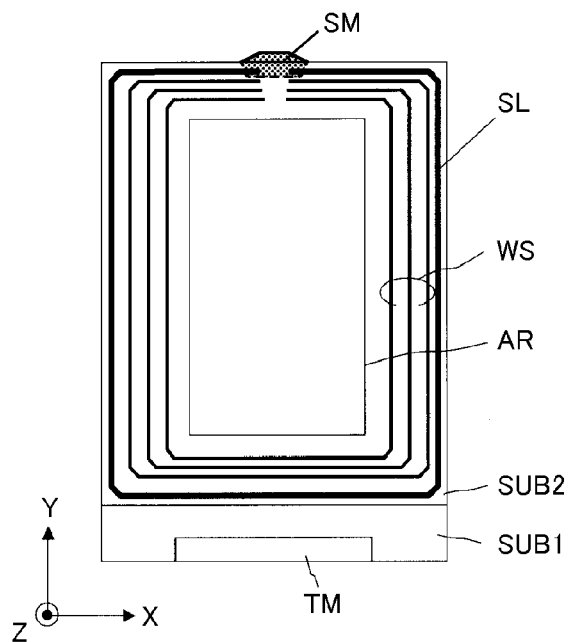
FIG. 10 is a diagram for explaining the shape of an alignment layer stopper in a liquid crystal display device according to Third Embodiment of the present invention.

FIG. 10 is a diagram for explaining the shape of the alignment layer stopper in a liquid crystal display device according to Third Embodiment of the present invention. The liquid crystal display device of Third Embodiment will be described hereinunder with reference to FIG. 10. The liquid crystal display device of Third Embodiment has the same constitution as that of First Embodiment except for the filling system of liquid crystals and the outer shape of the alignment layer stopper WS. Therefore, in the following description, the outer shape of the alignment layer stopper WS will be detailed.

In the liquid crystal display device of Third Embodiment, the fixing (bonding) of the first substrate SUB1 and the second substrate SUB2 is carried out by means of the seal material SL applied to the peripheral part of the second substrate SUB2. The sealing of liquid crystals sandwiched between the first substrate SUB1 and the second substrate SUB2 is carried out by means of the seal material SL and a seal material SM for closing an opening in the seal material SL.

According to this constitution, after the first substrate SUB1 and the second substrate SUB2 are formed, the first substrate SUB1 and the second substrate SUB2 are fixed by means of the seal material SL applied annularly to the peripheral part of the second substrate. At this point, in the liquid crystal display device of First Embodiment, the opening of the seal material SL formed at the center of the upper end in the figure is a liquid crystal filling port. After the liquid crystals are filled from this opening, the opening of the seal material SL is closed by means of the seal material SM.

In the liquid crystal display device of Third Embodiment, since the seal material SL is removed in the area where the seal material SM is to be applied out of the peripheral part of the display area AR, the liquid crystals do not overlap with the seal material SL. Therefore, the alignment layer stoppers WS1 to WS3 do not need to be arranged in the area where the seal material SL is not applied (removed). Consequently, in the constitution of Third Embodiment, the alignment layer stoppers WS1 to WS3 are not formed in the area where the seal material SL is not applied, that is, the area where the seal material SM is to be applied. Since the alignment layer stopper WS is not formed in the opening of the seal material SL, an effect is also obtained that the interference of the filling of the liquid crystals by the alignment layer stopper WS can be prevented at the time of filling the liquid crystals.

At this point, in the area where the seal material SL is applied, like First Embodiment, the alignment layer stoppers WS1 to WS3 are formed, whereby the electric field E1 between the first conductive layer SH forming the alignment layer stoppers WS1 to WS3 and the gate line GL can be made large and the electric field E2 between the second conductive layer SP and the gate line GL can be made extremely small, thereby making it possible to obtain the same effect as that of First Embodiment. The alignment layer stoppers WS1 to WS3 of Second Embodiment may be formed in the liquid crystal display device of Third Embodiment. In this case, the same effect as that of Second Embodiment is obtained.

<Fourth Embodiment>

Figure 11:
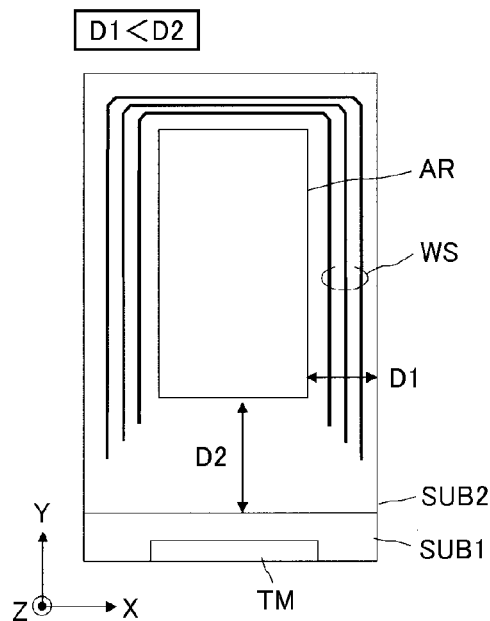
FIG. 11 is a diagram for explaining the shape of an alignment layer stopper in a liquid crystal display device according to Fourth Embodiment of the present invention.

FIG. 11 is a diagram for explaining the outer shape of the alignment layer stopper in a liquid crystal display device according to Fourth Embodiment of the present invention. The liquid crystal display device of Fourth Embodiment will be described hereinbelow with reference to FIG. 11. The liquid crystal display device of Fourth Embodiment has the same constitution as that of First Embodiment except for the outer shape of the alignment layer stopper WS and the signal line for coupling the drain lines DL to the drive circuit. Therefore, in the following description, the outer shape of the alignment layer stopper WS will be detailed.

As obvious from FIG. 11, the alignment layer stopper WS including the alignment layer stoppers WS1 to WS3 is not formed in a side part where the drive circuit and the connection terminal TM are formed and the distance between the marginal part of the display area AR and the marginal part of the second substrate SUB2 (substrate end) is long, out of the four sides of the rectangular liquid crystal display device. That is, the alignment layer stopper WS is formed like letter C to surround three sides excluding the lower side in FIG. 11 out of the four sides of the display area AR. This constitution can be applied, for example, to a side which satisfies D2>D1 when the distance between the marginal part of the display area AR and the marginal parts of the first substrate SUB1 and the second substrate SUB2 on sides extending in the Y direction (longitudinal direction) is represented by D1 and the distance between the marginal part of the display area AR and the marginal part of the second substrate SUB2 on a side extending in the X direction (transverse direction) is represented by D2 in the liquid crystal display device of Fourth Embodiment.

On the sides D1 which satisfy D2>D1, that is, on the upper side and the left and right sides in the figure, the distance between the marginal part of the display area AR and the marginal parts of the first substrate SUB1 and the second substrate SUB2 becomes small. Accordingly, the distance between the seal material formed annularly along the sides of the second substrate SUB2 and the marginal part of the display area AR becomes small. In contrast to this, since the distance D2 between the marginal part of the display area AR and the marginal part of the second substrate SUB2 is large on the lower side in the figure, the distance between the seal material applied along the side of the second substrate SUB2 and the marginal part of the display area AR becomes large. As a result, in Fourth Embodiment, even when the alignment layer stoppers WS1 to WS3 are not formed in the area between the marginal part of the display area AR and the marginal part of the second substrate SUB2, the alignment layer material applied to cover the display area AR does not reach the marginal part of the second substrate SUB2, that is, the coating area of the seal material, thereby making it possible to obtain the same effect as that of First Embodiment.

According to the constitution of Fourth Embodiment, a signal line is formed by extending a conductive thin film forming the drain lines DL of the display area AR, thereby making it possible to obtain a special effect that the drain lines DL can be electrically coupled to the drive circuit or the connection terminal TM by using the signal line.

<Fifth Embodiment>

Figure 12:
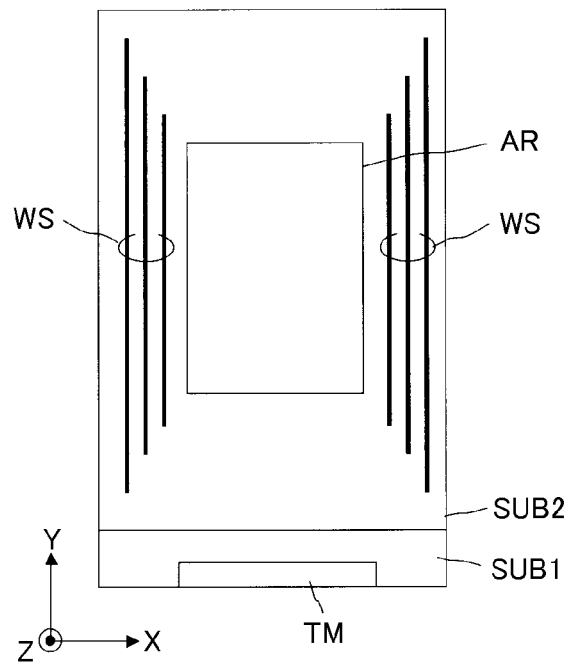
FIG. 12 is a diagram for explaining the shape of an alignment layer stopper in a liquid crystal display device according to Fifth Embodiment of the present invention.

FIG. 12 is a diagram for explaining the outer shape of the alignment layer stopper in a liquid crystal display device according to Fifth Embodiment of the present invention. The liquid crystal display device of Fifth Embodiment will be described hereinunder with reference to FIG. 12. The liquid crystal display device of Fifth Embodiment has the same constitution as that of First Embodiment except for the outer shape of the alignment layer stopper WS. Therefore, in the following description, the outer shape of the alignment layer stopper WS will be detailed.

As obvious from FIG. 12, in the liquid crystal display device of Fifth Embodiment, on two sides opposite to each other in the Y direction, that is, short sides out of the four sides of the rectangular liquid crystal display device, the distance between the marginal part of the display area AR and the marginal part of the second substrate SUB2 (substrate end) is larger than that on the long sides. Therefore, in the liquid crystal display device of Fifth Embodiment, the alignment layer stopper WS including the alignment layer stoppers WS1 to WS3 is formed only on the left and right sides in the figure where the distance between the marginal part of the display area AR and the marginal part of the second substrate SUB2 (substrate end) is small.

At this point, like the aforementioned Fourth Embodiment, even when the alignment layer stopper WS is not formed in the area between the display area AR and the marginal part of the second substrate SUB2 on sides where the distance between the marginal part of the display area AR and the marginal part of the second substrate SUB2 (substrate end) is large, the alignment layer material applied to cover the display area AR does not reach the marginal part of the second substrate SUB2, that is, the coating area of the seal material, thereby making it possible to obtain the same effect as that of First Embodiment.

<Sixth Embodiment>

Figure 13:
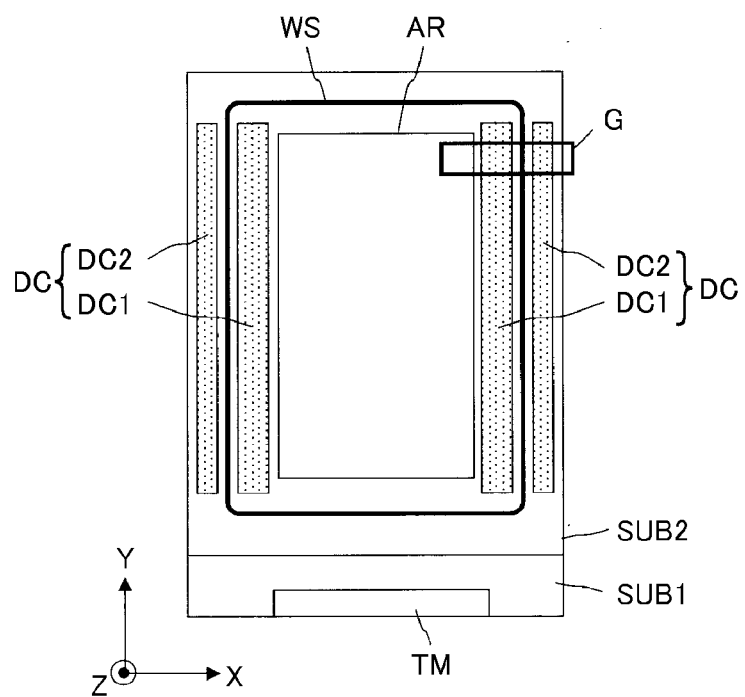
FIG. 13 is a diagram for explaining the schematic constitution of a liquid crystal display device according to Sixth Embodiment of the present invention.

FIG. 13 is a diagram for explaining the schematic constitution of a liquid crystal display device according to Sixth Embodiment of the present invention. The liquid crystal display device of Sixth Embodiment is obtained by applying the alignment layer stopper WS of the present invention to a liquid crystal display device in which an amorphous silicon (a-Si) scanning signal drive circuit (gate driver) DC is formed as a thin film transistor over the first substrate SUB1. As the method of forming the amorphous silicon gate driver, known photolithography may be used and a detailed description thereof is omitted.

As obvious from FIG. 13, the gate driver DC is formed in the peripheral parts PR in the longitudinal direction. Particularly, the alignment layer stopper WS is formed in the area of the gate driver DC in each of the peripheral parts PR. That is, in the liquid crystal display device of Sixth Embodiment, a first gate driver (first scanning signal drive circuit) DC1 and a second gate driver (second scanning signal drive circuit) DC2 form a single gate driver DC, and the alignment layer stopper WS extending in the Y direction (longitudinal direction) is formed in the area between the first gate driver DC1 and the second gate driver DC2. At this point, as will be described in detail hereinafter, Sixth Embodiment has the same constitution as that of First Embodiment except for the constitution of the second conductive layer SP forming the alignment layer stopper WS and the gate driver DC.

Figure 14:
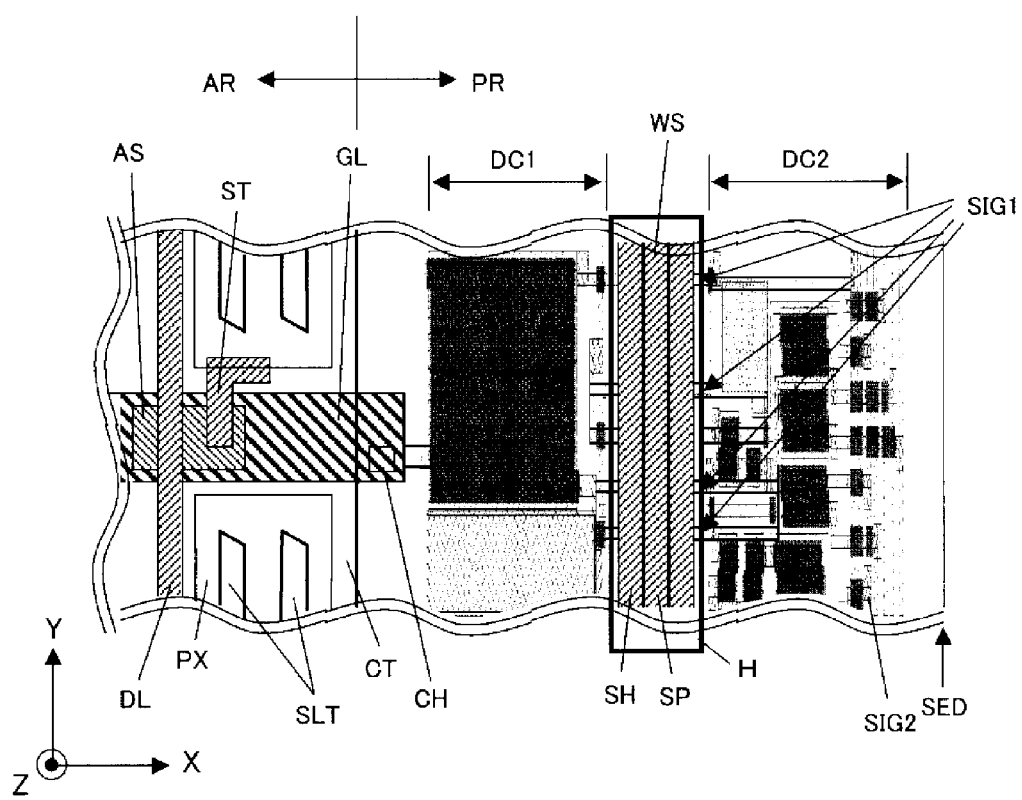
FIG. 14 is an enlarged view of apart G shown in FIG. 13.
Figure 15:
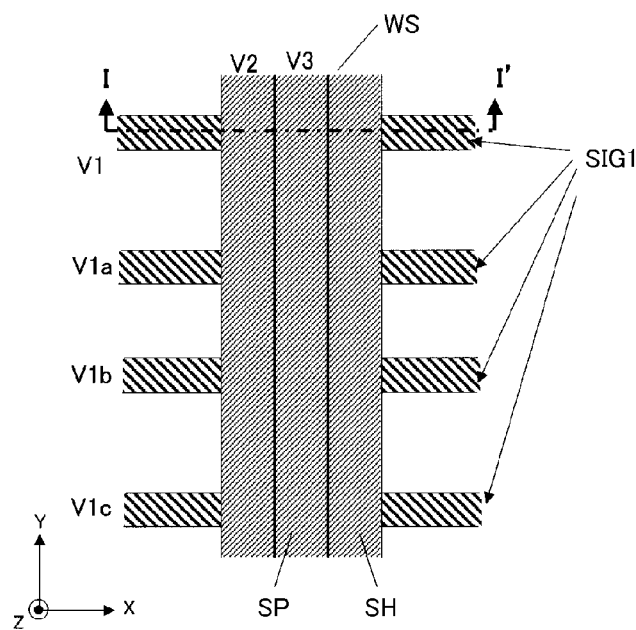
FIG. 15 is an enlarged view of a part H shown in FIG. 14.

FIG. 14 is an enlarged view of a part G shown in FIG. 13, that is, the peripheral part in the longitudinal direction of the liquid crystal display device of Sixth Embodiment. FIG. 15 is an enlarged view of a part H shown in FIG. 14, that is, the alignment layer stopper of Sixth Embodiment. The detailed constitution of the alignment layer stopper WS of Sixth Embodiment will be described hereinbelow with reference to FIG. 14 and FIG. 15.

As shown in FIG. 14, the gate driver DC including the first gate driver DC1 and the second gate driver DC2 is formed in the peripheral part PR of the display area AR. The alignment layer stopper WS formed from the first conductive layer SH and the second conducive layer SP extends in the Y direction (longitudinal direction) in the area between the first gate driver DC1 and the second gate driver DC2. The first gate driver DC1 and the second gate driver DC2 are electrically coupled to each other by signal lines SIG1 which cross the alignment layer stopper WS. At this point, the gate line GL is extended from the display area AR into the peripheral part PR and electrically coupled to a signal line extending from the first gate driver DC1 through a contact hole CH. A control signal is input into the second gate driver DC2 through signal lines SIG2 one ends of which are coupled to the terminal TM, and a scanning signal is generated according to the control signal by the gate driver DC including the first gate driver DC1 and the second gate driver DC2. Particularly, in the liquid crystal display device of Sixth Embodiment, the signal lines SIG2 are formed closer to the marginal parts SED of the first substrate SUB1 and the second substrate SUB2 than the second gate driver DC2. According to this constitution, the number of signal lines which cross the alignment layer stopper WS is reduced.

The alignment layer stopper WS is arranged orthogonal to the signal lines SIG1 extending in the X direction and parallel to one another in the Y direction as shown in an enlarged view of FIG. 15. At this point, the alignment layer stopper WS of Sixth Embodiment is formed from one second conductive layer SP and the first conductive layer SH formed between the second conductive layer SP and the signal lines SIG1 through an insulating film. According to this constitution, the distance of the signal lines SIG1 of the gate driver DC including the first gate driver DC1 and the second gate driver DC2 can be made short.

At this point, when the voltage of the first conductive layer SH is represented by V2, the voltage of the second conductive layer SP is represented by V3, and the voltages of the four signal lines SIG1 shown in FIG. 15 are represented by V1, V1a, V1b, V1c, respectively, V2=V3. V1≠V2, and V1a, V1b and V1c may be the same as or different from V2.

Figure 16:
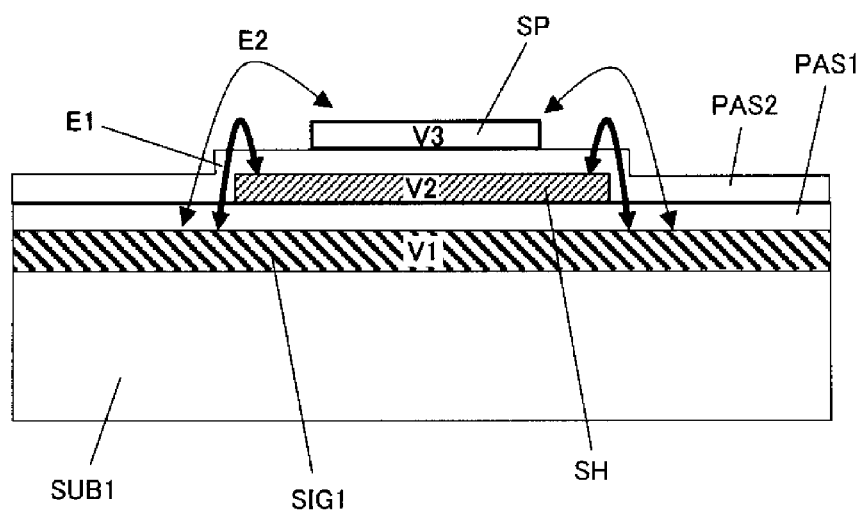
FIG. 16 is a sectional view taken on line I-I' of FIG. 15.

When this voltage is applied, as shown in FIG. 16 which is a sectional view taken on line I-I' of FIG. 15, a large electric field E1 is generated between the signal lines SIG1 and the first conductive layer SH, thereby making it possible to suppress an electric field E2 generated between the signal lines SIG1 and the second conductive layer SP. As a result, even when the alignment layer stopper WS crosses the signal lines SIG1, like First Embodiment, the corrosion of the signal lines SIG1 caused by the electric field E2 between the signal lines SIG1 and the second conductive layer SP can be prevented.

In the constitution of Sixth Embodiment, the annular alignment layer stopper WS is formed to surround the display area AR and the first gate driver DC1. The present invention is not limited to this. The alignment layer stopper may be formed as in Embodiments 3 to 5. The alignment layer stopper WS includes one second conductive layer SP but two or more second conducive layers SP may be formed.

Examples of the above alignment layer stopper detailed in First to Sixth Embodiments are summarized below.

(1) A liquid crystal display device characterized in that the above alignment layer stopper includes a pair of linear alignment layer stoppers which are arranged along two opposite sides of the display area to sandwich the display area.

(2) A liquid crystal display device characterized in that the above alignment layer stopper is formed like letter C along at least three sides of the display area.

(3) A liquid crystal display device characterized in that the above alignment layer stopper is formed along three sides excluding a side where the connection terminal is formed.

(4) A liquid crystal display device characterized in that the above alignment layer stopper is formed annularly to surround the above display area.

(5) A liquid crystal display device characterized in that the above alignment layer stopper is formed from one second conductive layer SP and one first conductive layer SH formed below the second conductive layer SP.

(6) A liquid crystal display device characterized in that the above alignment layer stopper is formed from two or more second conductive layers SP and one first conductive layer SH formed below the second conductive layers SP.

<Seventh Embodiment>

Figure 17:
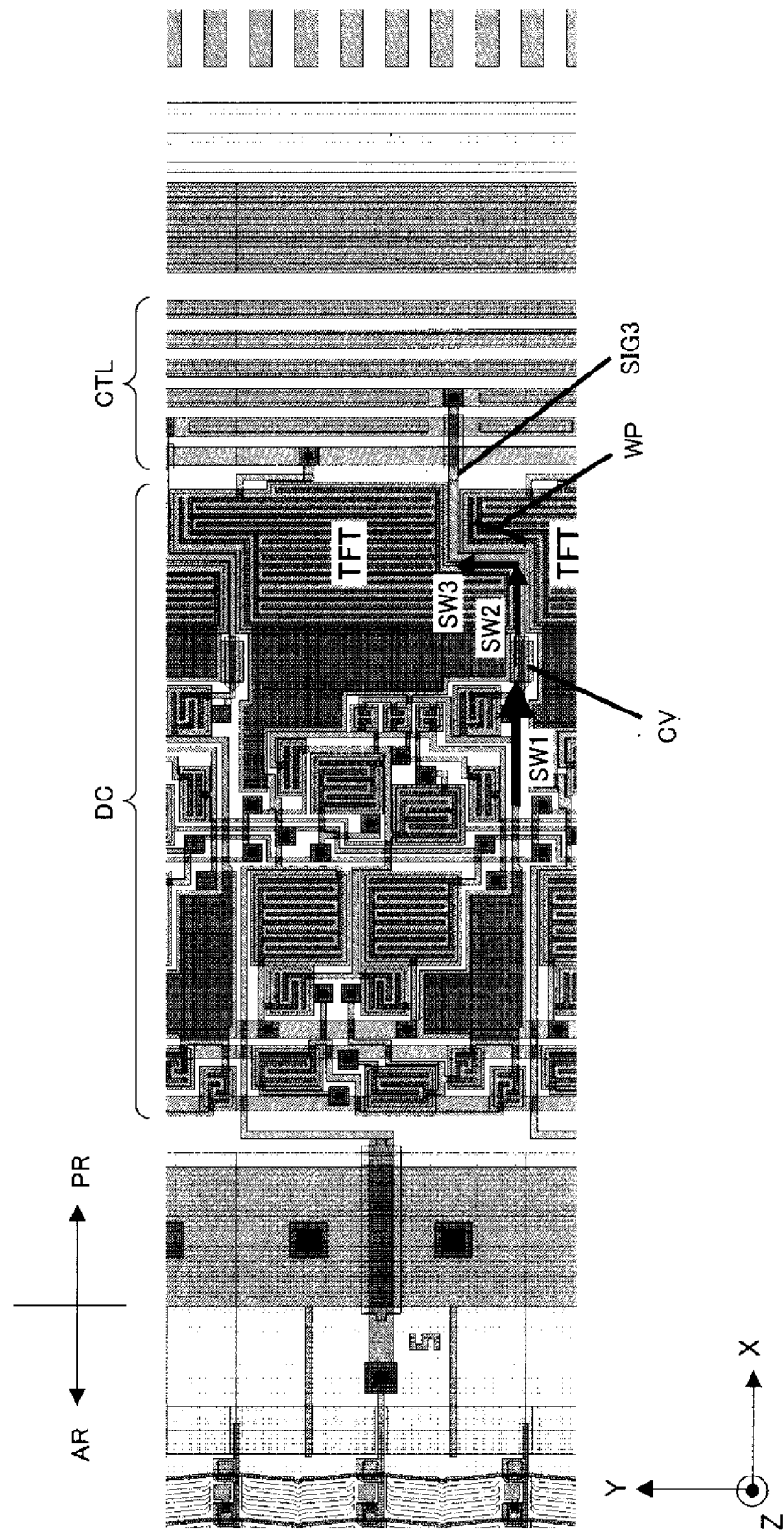
FIG. 17 is a magnified photo of the peripheral part of a substrate in a liquid crystal display device according to Seventh Embodiment of the present invention, showing a circuit wiring layout.
Figure 18:
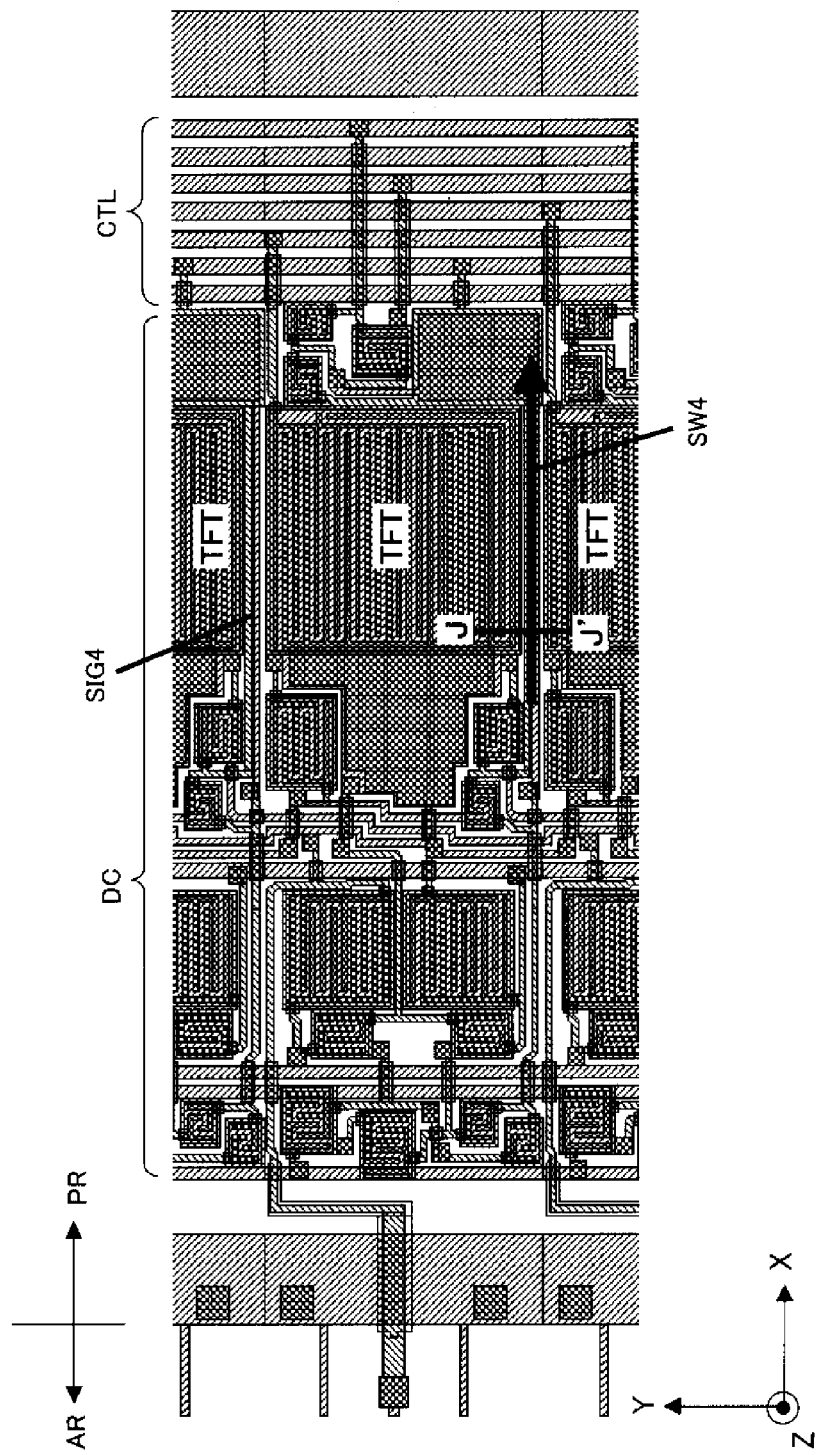
FIG. 18 is a magnified photo of the peripheral part of a substrate in a liquid crystal display device of the related art, showing a circuit wiring layout.
Figure 19:
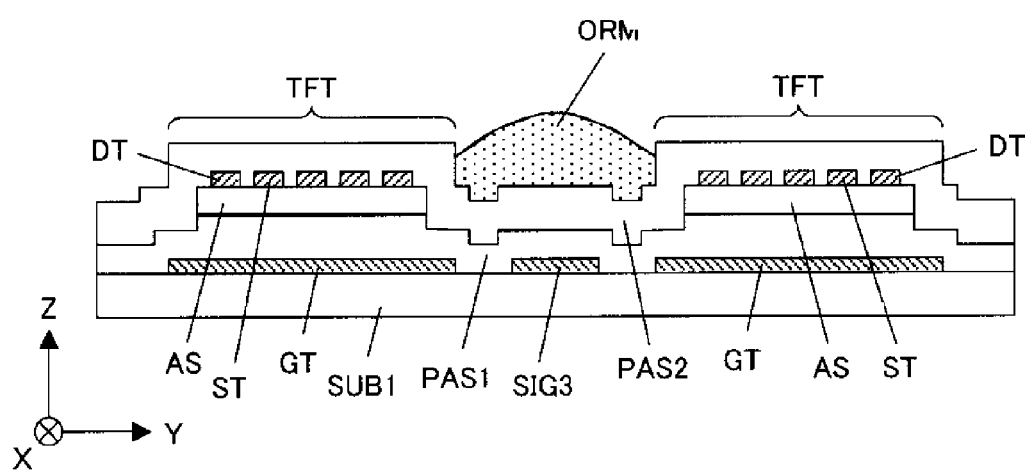
FIG. 19 is a sectional view taken on line J-J' of FIG. 18.

FIG. 17 is a magnified photo of the peripheral part of a substrate in a liquid crystal display device according to Seventh Embodiment of the present invention, showing a circuit wiring layout. FIG. 18 is a magnified photo of the peripheral part of a substrate in a liquid crystal display device of the related art, showing a circuit wiring layout. FIG. 19 is a sectional view taken on line J-J' of FIG. 18. A scanning signal drive circuit (gate driver) DC shown in FIG. 17 and FIG. 18 is formed in the area between the display area AR and control signal lines CTL into which a control signal is input from the connection terminal TM and which are arranged in the side part of the first substrate SUB1. In the liquid crystal display device of Seventh Embodiment, the formation of an alignment layer ORI into the seal area is prevented by the area in which the scanning signal drive circuit DC to be arranged in the peripheral part PR of the display area AR is formed. Therefore, the alignment layer stopper of the above embodiments may be formed in the side part where the scanning signal drive circuit DC is not formed.

As shown in FIG. 17, in the liquid crystal display device of Seventh Embodiment, the scanning signal drive circuit DC is formed in the peripheral part PR. The scanning signal drive circuit DC generates a scanning signal at a timing corresponding to the position of a gate line GL based on a control signal from a control signal line CTL extended from an unshown connection terminal. Therefore, in the area where the scanning signal drive circuit DC is formed, there is a big difference in the amount of projection of the first substrate SUB1 toward the liquid crystal side surface between a portion where a plurality of thin film transistors TFT constituting the scanning signal drive circuit DC are formed and a portion where only a wiring for electrically coupling the thin film transistors TFT, thereby forming a big level difference on the surface of the substrate.

Meanwhile, circuits which are coupled to the gate lines GL and generate a scanning signal corresponding to the formation position of each of the gate lines GL (referred to as "scanning signal generating circuits" hereinafter) are almost the same in the capacitance, structure and formation positions of thin film transistors TFT. The scanning signal generating circuits having the same constitution are arranged in the Y direction in which the gate lines GL are formed parallel to one another so as to form a scanning signal line drive circuit DC.

Each of the scanning signal generating circuits has two or more thin film transistors TFT into which a scanning signal from a control signal line CTL is directly input, and a signal delay of a reference signal over the control signal line CTL is minimized by shortening a signal line coupled to the control signal line CTL so as to reduce parasitic capacitance. A thin film transistor TFT having high circuit drive capability and a large occupied area is formed near the control signal lines CTL to reduce the length of the signal line, and the other relatively small thin film transistor TFT is formed near the display area AR. Further, to reduce the number of intersections between the control signal lines CTL and other signal lines, the control signal lines CTL are arranged on the marginal side of the first substrate SUB1.

In the scanning signal drive circuit DC of Seventh Embodiment, a signal line SIG 3 for coupling the thin film transistor TFT near the display area AR to the control signal lines CTL is formed in the area between adjacent scanning signal generating circuits. This signal line SIG3 is cranked by bending a signal line extending in the Y direction and then bending it in the Y direction again as shown by WP in FIG. 17 in the area close to the control signal lines CTL.

Further, in the area where this signal line SIG3 is arranged, a thin film layer CV crossing the signal line SIG3 is formed in a portion closer to the display area AR than the cranked portion, that is, the coating side of the alignment layer material. Particularly in the constitution of Seventh Embodiment, the thin film layer CV is formed by using a transparent conductive film layer as one electrode for forming a capacitative element arranged adjacent to the thin film transistor TFT contiguous to the control signal lines CTL. Owing to this constitution, an area projecting toward the liquid crystal surface side, that is, the thickness direction of the thin film layer is formed in a concave (groove-like) area sandwiched between relatively thick areas of the two adjacent thin film transistors TFT and formed along the signal line SIG3 formed between the adjacent thin film transistors TFT.

In this case, as shown in FIG. 19, when a linear signal line SIG4 is formed between adjacent thin film transistors TFT, a concave groove is formed. Therefore, a liquid alignment layer material ORM applied to cover the display area AR extends in the direction of the control signal lines CTL along an arrow SW4 shown in FIG. 18. Consequently, the alignment layer is formed in the area to be applied by the seal material.

In contrast to this, in the constitution of Seventh Embodiment, as shown by an arrow SW1 in FIG. 17, part of the liquid alignment layer material applied to the display area AR extends along the concave area in which the signal line SIG3 is formed. In Seventh Embodiment, since a transparent conductive film is formed in such a manner that it crosses the signal line SIG3 in the projecting area formed by the thin film layer CV in the alignment layer material extending along the signal line SIG3, the depth of the concave groove formed by two thin film transistors TFT is small by the thickness of the transparent conductive film. Therefore, as shown by an arrow SW2 in FIG. 17, the amount of the alignment layer material extending along the signal line SIG3 is reduced considerably. Thereafter, in the constitution of Seventh Embodiment, since the alignment layer material passes through the cranked area WP, as shown by an arrow SW3, the alignment layer material is further reduced in quantity and stopped in the cranked area WP.

As a result, the alignment layer can be prevented from being formed in the area in which the control signal lines CTL are to be formed or the area in which the seal material is to be applied, thereby making it possible to improve adhesion by the seal material. As a result, the reliability of the liquid crystal display device can be improved.

When Seventh Embodiment is summarized again, it has the following features.
(1) A liquid crystal display device in which the above projecting area is made from a thin film layer formed to cross the above groove.
(2) A liquid crystal display device in which the above groove is formed along a signal line for electrically coupling the above thin film transistors to the above control signal lines and the thin film layer crossing the above groove is an extension of part of a circuit element constituting the above drive circuit.

In the liquid crystal display device of Seventh Embodiment, the concave area formed between adjacent thin film transistors TFT and the signal line SIG3 match each other. The present invention can be applied to another concave area formed in the Y direction. In this case, by forming a thin film layer in such a manner that it crosses the concave area, a projecting body projecting toward the liquid crystal surface side is formed in the concave area and a cranked area WP is formed to obtain the above effect.

While the present invention has been described in its preferred embodiments, the present invention is not limited to the above embodiments and various changes and modifications may be made in the invention without departing from the spirit of the invention.

The present invention is not limited to the above embodiments and includes various modifications. For example, the above embodiments are detailed to make the present invention easily understood and are not limited to an embodiment having all the explained constitutions. Part of the constitution of a certain embodiment may be substituted by the constitution of another embodiment, and the constitution of another embodiment may be added to the constitution of a certain embodiment. The addition, deletion or substitution of another constitution may be carried out on part of the constitution of an embodiment.

What is claimed is:

1. A liquid crystal display device comprising:
   a first substrate having a plurality of scanning signal lines extending in the X direction and parallel to one another in the Y direction and a plurality of image signal lines extending in the Y direction and parallel to one another in the X direction formed thereover;
   a second substrate opposed to the first substrate through a liquid crystal layer;
   a display area surrounded by the scanning signal lines and the image signal lines in which pixels are arranged in a matrix,
   wherein the first substrate and the second substrate are fixed by means of a seal material formed along the marginal part of the second substrate, the liquid crystal layer is sealed between the first substrate and the second substrate, the first substrate is larger in size than the second substrate, and a connection terminal is formed in an exposed area not opposed to the second substrate of the first substrate;
   an alignment layer stopper which is formed external to the display area and along at least two different sides of the display area and prevents an alignment layer before curing from flowing into the area of the seal material when the alignment layer is formed, and
   wherein the alignment layer stopper is made of a thin film material having hydrophobic nature for a liquid alignment layer material and includes a second conductive layer SP formed above the first substrate and a first conducive layer SH arranged below the second conductive layer SP through an insulating film and arranged in such a manner that its marginal parts in the longitudinal direction when viewed in a plane direction from the second conductive layer SP are exposed from the marginal parts in the longitudinal direction of the second conductive layer SP, and the first conductive layer SH is formed between signal lines arranged in side parts of the display area and the second conductive layer SP through an insulating film layer.

2. The liquid crystal display device according to claim 1, wherein the alignment layer stopper includes a pair of linear alignment layer stoppers which are arranged along two opposite sides of the display area and sandwich the display area.

3. The liquid crystal display device according to claim 1, wherein the alignment layer stopper is formed like letter C along at least three sides of the display area.

4. The liquid crystal display device according to claim 3, wherein the alignment layer stopper is formed along three sides excluding a side where the connection terminal is formed.

5. The liquid crystal display device according to claim 1, wherein the alignment layer stopper is formed annular to surround the display area.

6. The liquid crystal display device according to any one of claims 1 to 5, wherein the alignment layer stopper includes one second conductive layer SP and one first conductive layer SH formed below the second conducive layer SP.

7. The liquid crystal display device according to any one of claims 1 to 5, wherein the alignment layer stopper includes two or more second conductive layers SP and one first conductive layer SH formed below the second conductive layers SP.

8. The liquid crystal display device according to any one of claims 1 to 5 comprising a drive circuit for generating the scanning signal or/and the image signal, which is formed in the peripheral part of the display area and in the same step as the formation of the pixels,
   wherein the drive circuit includes a first drive circuit contiguous to the display area and a second drive circuit contiguous to the marginal part of the first substrate, and
   the alignment layer stopper is formed in an area between the first drive circuit and the second drive circuit.

9. The liquid crystal display device according to claim 8, wherein the alignment layer stopper includes one second conductive layer SP and one first conductive layer SH formed below the second conductive layer SP.

10. The liquid crystal display device according to claim 8, wherein the alignment layer stopper includes two or more second conductive layers SP and one first conductive layer SH formed below the second conductive layers SP.

11. A liquid crystal display device comprising:
    a first substrate having a drive circuit and signal lines formed in side parts;
    a second substrate opposed to the first substrate and formed smaller in size than the first substrate;
    a seal material formed along the marginal part of the second substrate and used to fix the first substrate and the second substrate;
    a liquid crystal layer sealed by the seal material between the first substrate and the second substrate;
    a connection terminal formed in an exposed area not disposed to the second substrate of the first substrate;
    a display area in which a plurality of pixels are arranged in a matrix;
    an alignment layer formed over the first substrate and the second substrate; and
    an alignment layer stopper formed external to the display area and along at least two different sides of the display area and used to prevent an alignment layer before curing from flowing into the area of the seal material when the alignment layer is formed,
    wherein the alignment layer stopper is made of a thin film material having hydrophobic nature for a liquid alignment layer material and includes a second conductive layer formed above the first substrate and extending along the sides and a first conductive layer formed below the second conductive layer through an insulating film and extending along the second conductive layer, its marginal parts in the extending direction project from the marginal parts in the extending direction of the second conductive layer, and the first conductive layer is formed between signal lines arranged in the side parts of the display are and the second conductive layer through an insulating film.

12. The liquid crystal display device according to claim 11, wherein the alignment layer stopper includes a pair of linear alignment layer stoppers arranged along two opposite sides of the display area and sandwiching the display area.

13. The liquid crystal display device according to claim 11, wherein the alignment layer stopper is formed like letter C along at least three sides of the display area.

14. The liquid crystal display device according to claim 13, wherein the alignment layer stopper is formed along three sides excluding a side where the connection terminal is formed.

15. The liquid crystal display device according to claim 11, wherein the alignment layer stopper is formed annular to surround the display area.

16. The liquid crystal display device according to any one of claims 11 to 15, wherein the alignment layer stopper includes one second conductive layer and one first conductive layer formed below the second conductive layer.

17. The liquid crystal display device according to any one of claims 11 to 15, wherein the alignment layer stopper includes two or more second conductive layers and one first conductive layer formed blow the second conductive layers.

* * * * *